US012601934B2

(12) United States Patent
Feinbloom et al.

(10) Patent No.: US 12,601,934 B2
(45) Date of Patent: Apr. 14, 2026

(54) REMOVABLE EYEWEAR FILTER

(71) Applicant: Designs for Vision, Inc., Bohemia, NY (US)

(72) Inventors: Richard E. Feinbloom, New York, NY (US); Matthew Kenyon, St. James, NY (US)

(73) Assignee: Carl A. Giordano, Bohemia, NY (US)

( * ) Notice: Subject to any disclaimer, the term of this patent is extended or adjusted under 35 U.S.C. 154(b) by 310 days.

(21) Appl. No.: 18/266,932

(22) PCT Filed: Mar. 8, 2022

(86) PCT No.: PCT/US2022/019315

§ 371 (c)(1),
(2) Date: Jun. 13, 2023

(87) PCT Pub. No.: WO2022/197485

PCT Pub. Date: Sep. 22, 2022

(65) Prior Publication Data

US 2024/0061275 A1      Feb. 22, 2024

Related U.S. Application Data

(60) Provisional application No. 63/160,805, filed on Mar. 13, 2021.

(51) Int. Cl.
| | |
|---|---|
| *G02C 9/04* | (2006.01) |
| *G02C 7/08* | (2006.01) |
| *G02C 7/10* | (2006.01) |

(52) U.S. Cl.
CPC ............... *G02C 9/04* (2013.01); *G02C 7/088* (2013.01); *G02C 7/104* (2013.01); *G02C 2200/02* (2013.01)

(58) Field of Classification Search
CPC .......... G02C 7/10; G02C 7/104; G02C 7/105; G02C 7/107; G02C 7/108; G02C 7/088;
(Continued)

(56) References Cited

U.S. PATENT DOCUMENTS

| | | |
|---|---|---|
| 6,607,270 B2 | 8/2003 | Feldman |
| 6,742,888 B1 | 6/2004 | Kim |

(Continued)

OTHER PUBLICATIONS

International Search Report and Written Optonion dated May 17, 2022 for International Application No. PCT/US2022/019314 filed Mar. 8, 2022.

*Primary Examiner* — George G. King
*Assistant Examiner* — Natasha Nigam
(74) *Attorney, Agent, or Firm* — Law Office of Carl Giordano, PC

(57) ABSTRACT

The invention disclosed relates to a removable eyewear filter system configured to by placed on a surgical or dental eyewear that includes loupe or magnification devices that allow for the filtering of light wavelengths for the purpose of viewing areas that may be generating a fluorescent light, where the removable eyewear filter system includes a frame incorporating a plurality of lens, each of which includes a loupe of known magnification and a filter element, removably attachable to the frame, includes a first section substantially adjacent the lens and a second section substantially adjacent a distal end of the loupes, wherein the filter elements are configured to attenuate light wavelengths in an undesired wavelength band and allow light wavelengths in a desired wavelength band to pass substantially unattenuated.

18 Claims, 9 Drawing Sheets

(58) Field of Classification Search
  CPC ...... G02C 2200/02; G02C 9/04; G02B 7/006;
        G02B 5/201; G02B 5/204; G03B 17/566;
                          G03B 11/00
  See application file for complete search history.

(56) References Cited

U.S. PATENT DOCUMENTS

| | | | |
|---|---|---|---|
| 6,948,810 | B1 | 9/2005 | Kim |
| 10,895,735 | B1 | 1/2021 | Feinbloom |
| 2006/0268220 | A1 | 11/2006 | Hogan |
| 2008/0017787 | A1 | 1/2008 | Okawa |
| 2015/0243589 | A1 | 8/2015 | Ho et al. |
| 2017/0353646 | A1* | 12/2017 | Wang .................... H10F 39/182 |
| 2020/0117025 | A1* | 4/2020 | Sauer ........................ G02C 9/00 |
| 2020/0264404 | A1* | 8/2020 | Hanaoka ................ G02B 7/021 |

* cited by examiner

REMOVABLE EYEWEAR FILTER

CROSS REFERENCE TO RELATED APPLICATIONS AND CLAIM OF PRIORITY

This application is the U.S. National Phase application under 35. U.S.C. 371 of the International Application No. PCT/US2022/019315 filed on Mar. 8, 2022, published as WO 2022/197485 on Sep. 22, 2022, which claims the benefit of the earlier filing date of US Provisional patent application 63/160,805 filed on Mar. 13, 2021, the contents of all of which are incorporated by reference, herein.

BACKGROUND OF THE INVENTION

Field of the Invention

The invention is related to the field of optics and eyewear and in particular to a removable filter attachable to an eyewear.

Background Information

Special purpose eyewear has been a fixture in the medical and dental fields where practitioners utilize magnification devices incorporated into eyewear to enable the practitioner to view in further detail, by the use of magnification, an area of interest to the practitioner.

Fluorescent emission technology (FET) has emerged as a new tool that practitioners utilize to identify healthy tissue from diseased tissue. Particularly, FET utilizes light technology and the knowledge that bacteria or infection in tissue generate a fluorescent light when illuminated with light of desired wavelengths.

However, the fluorescent light emitted is generally of a low intensity and may easily be concealed within the surrounding ambient light. To isolate the fluorescent light from the light illuminating the area (i.e., the excitation light) filters are employed to pass only the fluorescent light while blocking the excitation light. However, the use of the filter prevents the practitioner from viewing the area with the surrounding ambient light.

Hence, there is a need in the industry for a removable filter system that may be utilized with eyewear that allows a practitioner to utilize FET to identify problem areas while allowing the practitioner view the area with ambient light.

SUMMARY OF THE INVENTION

Disclosed is a removable filter assembly customized to provide filtering capability for eyewear.

It is an object of the invention disclosed to provide a filter system that may be removably attachable to an eyewear associated with surgical and dental practice.

It is an object of the invention disclosed to provide a customizable filter configuration removably attachable to an eyewear associated with surgical and dental practice.

It is an object of the invention disclosed to provide a filter assembly that provides for filtering of light in known wavelength bands for both plano or corrective lens and loupes (i.e., magnification devices) incorporated into the lenses of the eyewear.

It is an object of the invention disclosed to provide a filter assembly that may employ magnetic force to retain the filter assembly to the eyewear.

It is an object of the invention to provide an accessory that may be used with currently available surgical and dental eyewear to cause the attachment of the filter assembly as disclosed, herein.

The explicitly recited objectives and objectives that are not explicitly recited but may be achieved from the description of the invention disclosed are considered within the scope of the invention as expressed in the attached set of claims

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

BRIEF DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description, herein, should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

Figure 1:
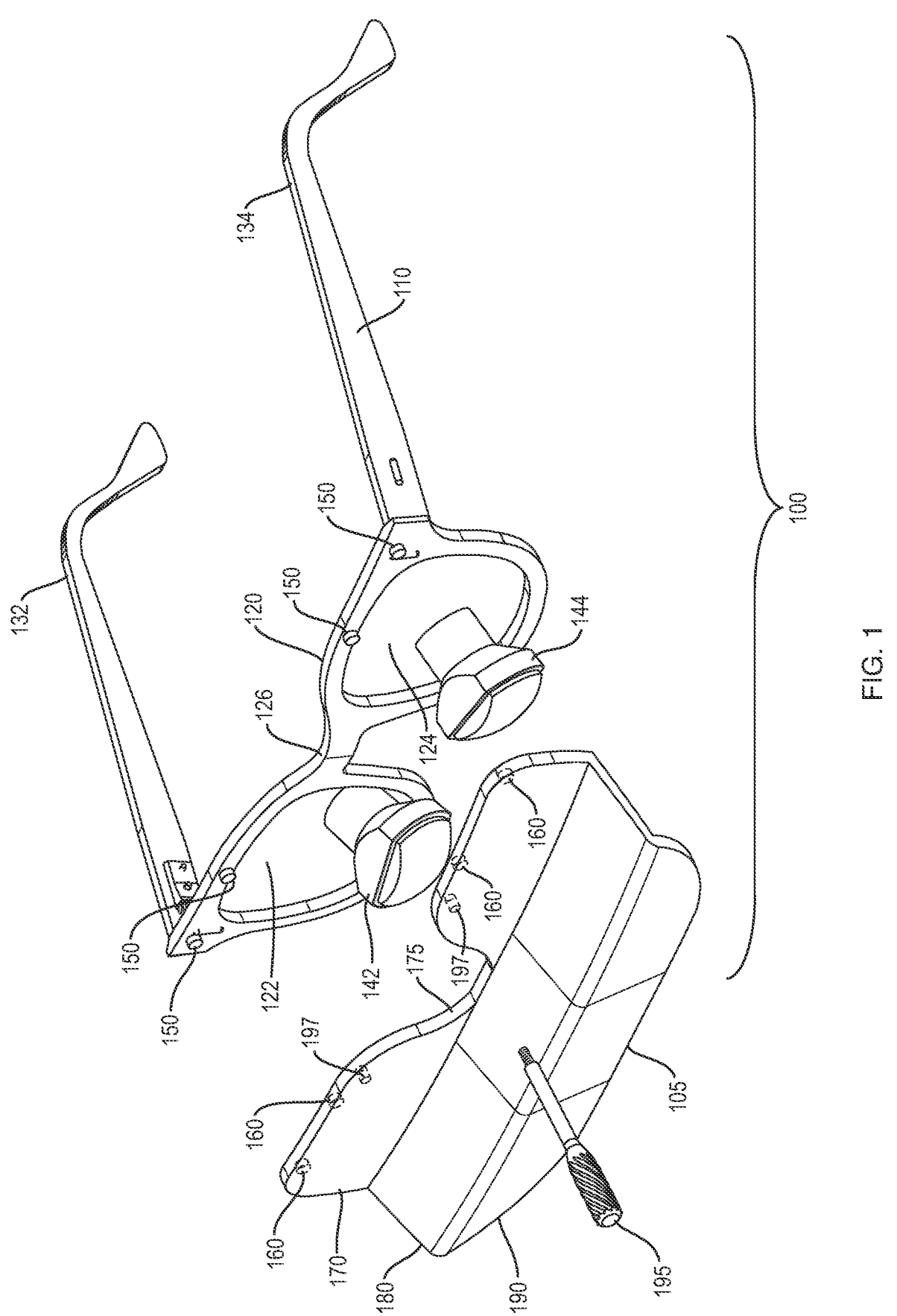
FIG. 1 illustrates a prospective view of a first exemplary embodiment of a removable filter system in accordance with the principles of the invention.

FIG. 1 illustrates a prospective view of a filter system 100 comprising filter assembly 105 which is suitable for providing light filtering capability to eyewear 110 in accordance with the principles of the invention.

In this illustrated exemplary embodiment eyewear 110 comprises an eyeglass frame 120 comprising a first lens 122 and a second lens 124 connected by a bridge element 126. Further illustrated are temples, 132, 134 projecting substantially perpendicular from a free end of each of first lens 122 and second lens 124, respectively. Temples 132, 134 provide a means to retain eyeglasses 110 to a user.

Eyewear 120 further includes magnification device 142 incorporated into lens 122 and magnification device device 144 incorporated into lens 124. Magnification devices 142, 144 provide for the magnification of the viewing of an object. Magnification devices 142, 144, as shown, may provide a specific magnification level, which in part is determined based on a length (or distance) between an objective lens (not shown) on a distal end of devices 142 (144) and an eyepiece lens (not shown) on a proximal end of device 142 (144). Thus, while a shorten device device 142 is shown it will be recognized that the filter assembly disclosed, herein, is applicable to magnification devices that may be longer (i.e., greater magnification) or shorter (i.e., less magnification without altering the scope of the invention claimed.

Further illustrated are a plurality of elements 150 positioned on eyeglass frame 120. Elements 150, as will be discussed, provided for the attachment and retention of a filter assembly 105.

Filter assembly 105, which, in cross-section, is structured as a modified "Z" form, comprises a first filter section 170 (referred to as lens section), an offset section 180 and a second filter section 190 (magnification section), wherein the offset section 180 displaces the lens section 170 with respect to the magnification section 190. In accordance with the principles of the invention, offset section 180 is sized to compensate for a length of magnification devices 142, 144 in lens 122, 124, respectively, such that the magnification section 190 is substantially proximal to a distal end of magnification devices 142, 144 when filter assembly 105 is positioned on eyewear 110.

In accordance with the principles of the invention, lens section 170 and magnification section 190 may provide for the filtering of light that would enter lens 122, 124 and magnification devices 142, 144, respectively, wherein the optical characteristics of the lens section 170 and the magnification section 190, may be formulated, in part, based on the selection of the light wavelengths to be viewed and light wavelengths to not be viewed and the expected input power of the light to be viewed through filter element 105.

Thus, in the context of the description of the invention, herein, it would be understood, lens section 170 and magnification section 190 include materials that provide for the filtering (i.e., attenuation) of light wavelengths in at least one wavelength band and allow light wavelengths in a desired wavelength band to pass substantially unattenuated.

In one aspect of the invention, the optical characteristic (e.g., wavelength range to be attenuated/viewed) of first section 170 and second section 190 may be selected to be substantially the same.

For example, the optical density of lens section 170 and magnification section 190 may be increased by the use of absorptive material incorporated within lens section 170 and magnification section 190, wherein light possessing undesired wavelengths is absorbed by the absorptive matter (i.e., absorptive filtering). In another aspect of the invention the optical density of lens section 170 and magnification section 190 may be increased by the use of reflective material incorporated within lens section 170 and magnification section 190, wherein light possessing undesired wavelengths is reflected by the reflective matter (i.e., reflective filtering).

Alternatively, the optical characteristics (e.g., wavelength range to be attenuated/viewed, degree of attenuation, etc.,) of lens section 170 and magnification section 190 may be different such that the degree of attenuation of light being viewed through magnification devices 142, 144 may be different than the degree of attenuation of light through lens 122, 124. For example, optical characteristics of lens 122, 124 may be determined based, in part, on the expected power density of wavelengths of an undesired light to be attenuated, whereas the optical characteristics of magnification devices 142, 144 may be determined based, in part, on the expected power density of the wavelengths of the undesired light to be viewed and the level of magnification of the magnification devices 142, 144 as the magnification produced by the magnification devices 142, 144 causes the light to become more concentrated. Thus, the optical density of the filtering capability of magnification section 190 may be greater than the optical devices of lens section 170.

Further illustrated is attachment rod 195, which is removably attachable to filter assembly 105, and may connect to passthrough 197. Rod 195/passthrough 197 enables a user to hold filter assembly 105 without touching filtering assembly 105 so as to place filter assembly 105 onto eyeglass frame 120. Passthrough 197 may include, for example, a screw thread that enables rod 195, which may also include a matching screw thread, to be retained to passthrough 197. Although a screw tread is discussed, it would be recognized that rod 195/passthrough 197 may include other types of connection means, such as a bayonet connection, a snap fit connection, etc. In addition, although passthrough 197 is shown incorporated into lens section 170 it would be recognized that passthrough 197 may be incorporated into magnification section 190, for example, and is considered within the scope of the invention.

In one aspect of the invention, lens section 170 may include a plurality of elements 160 composed of a material that allows for the attachment of lens section 170 to the elements 150 on frame 120. In this illustrated example, elements 160 are positioned on a surface adjacent (e.g., substantially perpendicular) to an upper edge of lens section 170. The plurality of elements 160 along the surface adjacent said upper edge of lens section 170 are aligned to the elements 150 of frame 120.

In one aspect of the invention, elements 150 may comprise a material possessing magnetic properties and elements 160 may comprise a material (e.g., ferrous) that may be attracted to the magnetic force applied by elements 150. In another aspect of the invention elements 160 may comprise a material possessing magnetic properties and elements 150 may comprise a material (e.g., ferrous) that may be attracted to the magnetic force applied by elements 160. In still another aspect of the invention, both elements 150 and 160 may comprise materials possessing magnetic properties such that elements 150 and 160 are attracted to each other.

Attachment rod 195 may be utilized to position filter assembly 105 with respect to eyewear frame 120 until a magnetic force between elements 150 and 160 retains filter assembly 105 in place.

The removably attachable filter assembly 105 is advantageous as it provides a low cost means for viewing of selected or desired light wavelengths for limited periods of time.

In one aspect of invention, filter array 105 may be composed of a light weight, substantially optically clear material (e.g., polycarbonate, acrylic, glass, etc.) that may be selectively infused (absorptive), or coated (reflective), with a material that may alter the optical characteristics of the optically clear material to attenuate wavelengths is an undesired wavelength range and allow wavelengths in a desired wavelength range to pass substantially unattenuated.

Figure 2:
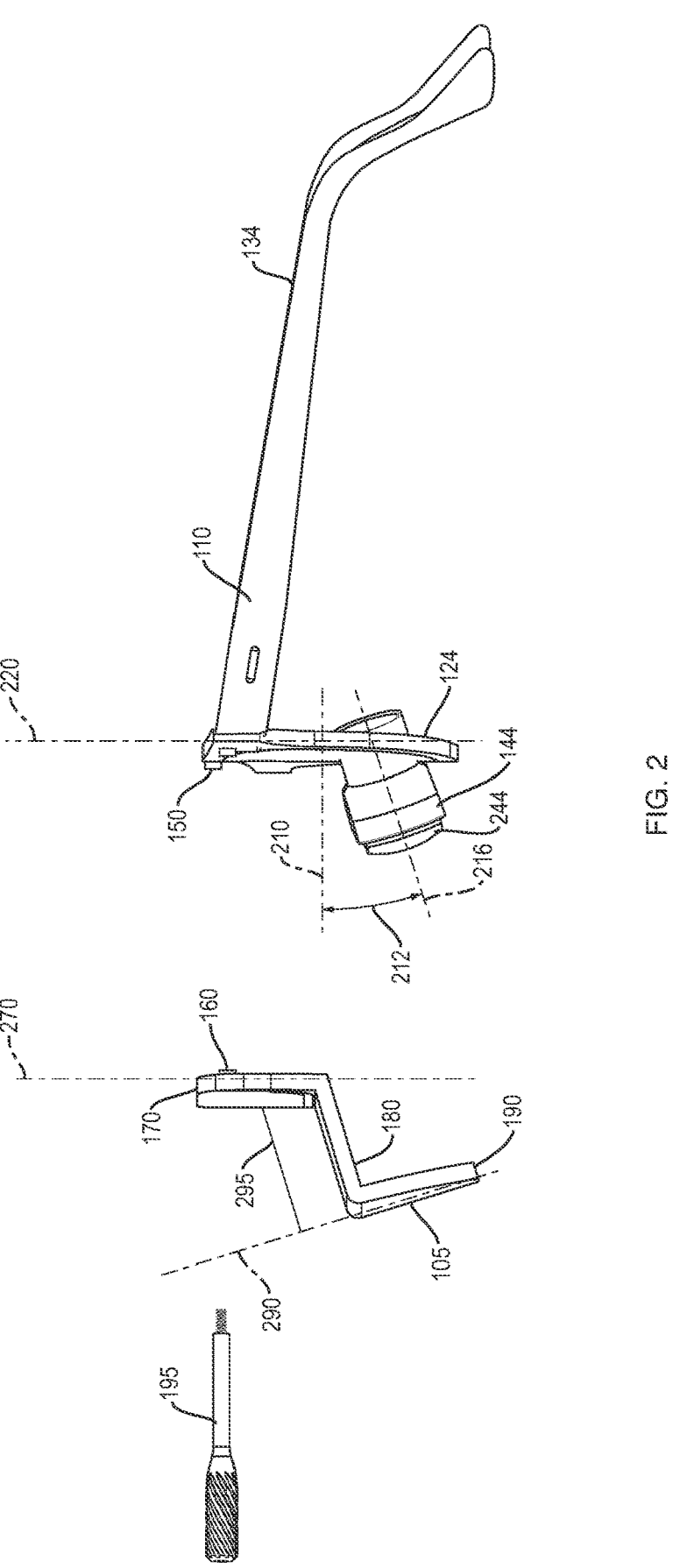
FIG. 2 illustrates a side view of the first exemplary embodiment of the removable filter system shown in FIG. 1.

FIG. 2 illustrates a side view of the first exemplary embodiment of a filter system 100 in accordance with principles of the invention.

In this illustrated embodiment, an optical axis 216 through magnification device 144 is shown oriented at an angle 212 downwardly from horizontal line 210. The downward angle (referred to as a declination angle) 212 is based, in part, on a distance to an object onto which magnification device 144 is to be focused.

Further illustrated is filter array 105 comprising lens section 170, offset section 180 and magnification section 190, wherein lens section 170 is shown in a plane 270 substantially parallel to plane 220 of lens 124. Further illustrated are elements 160 on lens section 170 and element 150 on frame 120, which allow for the removable attachment of filter assembly 105 to frame 120.

Further illustrated is offset section 180 extending away from plane 270 and oriented at an angle substantially similar to declination angle 212. Offset section 180 provides an offset between planes 220 and 270 that compensates for the length of magnification devices 142, 144 such that magnification section 190 is positioned substantially proximate to a distal end 244 of magnification device 144.

In this illustrated example, magnification section 190 is shown laying within plane 290, which is substantially perpendicular to offset section 180 and to optical axis 216 of magnification devices 144. Although not shown, it would be recognized that magnification device 142 is oriented in a manner similar to magnification device 144.

The orientation of magnification section 190 being substantially perpendicular to an optical axis 216 of magnification devices 142, 144 is advantageous as it provides for a substantially unobstructed and undistorted view of an object (not shown) being viewed.

In another aspect of the invention, offset section 180 may be constructed such that offset section 180 is substantially perpendicular to lens section 170 and, thus, the angle of magnification section 190 with respect to offset section 180 may be altered so as to retain magnification section 190 substantially perpendicular to optical axis 216 and proximate to distal end 244 of magnification device 144.

As offset section 180 provides a separation between lens section 170 and magnification section 190, it would be recognized that the length of offset section 180 (i.e., distance 295) is based, in part, on the length of magnification device 144. That is, as the magnification level, and the length, of magnification device 144 increases, distance 295 is increased to retain magnification section 190 proximate to distal end 244 of magnification devices 142, 144.

Figure 3:
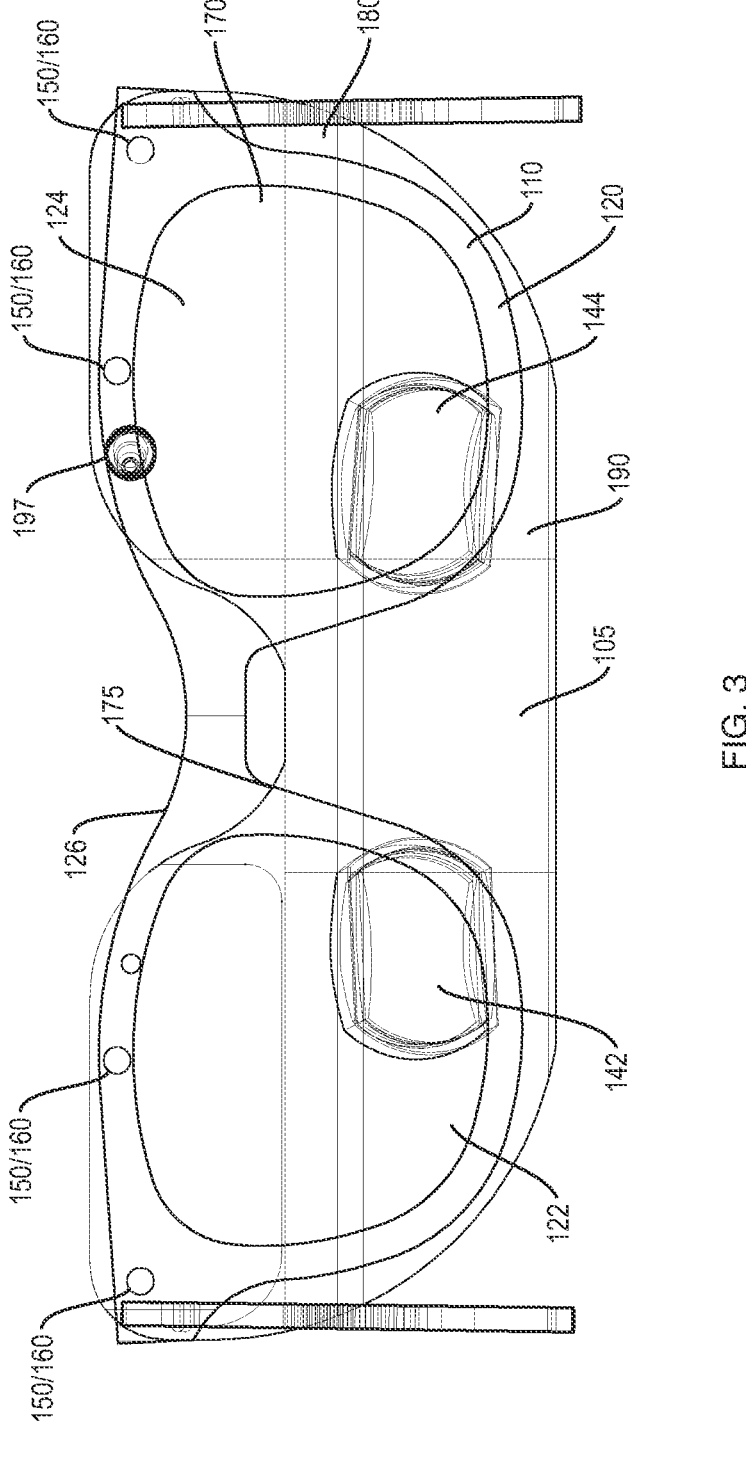
FIG. 3 illustrates a front view of the first exemplary embodiment of the removable filter system shown in FIG. 1.

FIG. 3 illustrates a front view of an exemplary configuration of filter element 105 attached to eyewear 110 in accordance with the principles of the invention.

In this illustrated view, filter array 105 is shown attached to frame 120 through the magnetic attraction between elements 150 and 160. Further illustrated is lens section 170 positioned in front of lens 122 and 124 and magnification section 190 positioned in front of magnification devices 122, 124.

Figure 4:
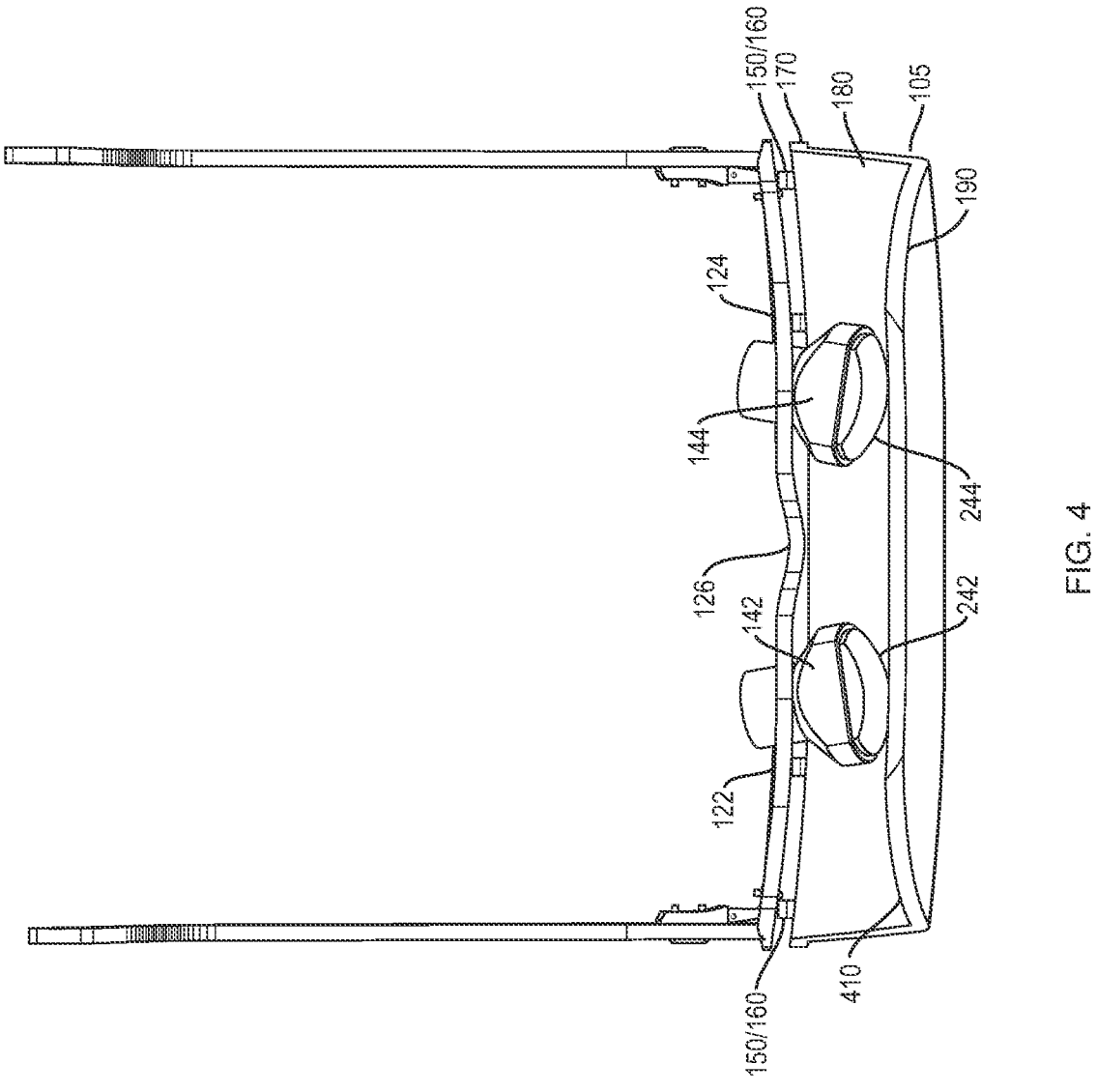
FIG. 4 illustrates a top view of the first exemplary embodiment of the removable filter system shown in FIG. 1.

FIG. 4 illustrates a top view of the exemplary filter system 100 comprises filter element 105 and eyewear 110 shown in FIG. 1.

In this illustrated view, a lower edge 410 of magnification section 190 is shown through offset section 180, as magnification section 190 extends from offset section 180 at an angle that enables magnification section 190 to be positioned substantially perpendicular to the optical axis 216, (see FIG. 2) and proximate to distal end 242, 244, of magnification devices 122, 124, respectively.

Further illustrated is elements 150/160 that allow for the removable attachment of filter assembly 105 to frame 120.

Although a magnetic attachment is shown, if would be recognized that other means of removable attachment of filter assembly 105 to frame 120 have been contemplated and considered. For example, filter assembly 105 may include a clip element (not shown) that attaches to bridge section 126 or to an upper member of frame 120.

Figure 5:
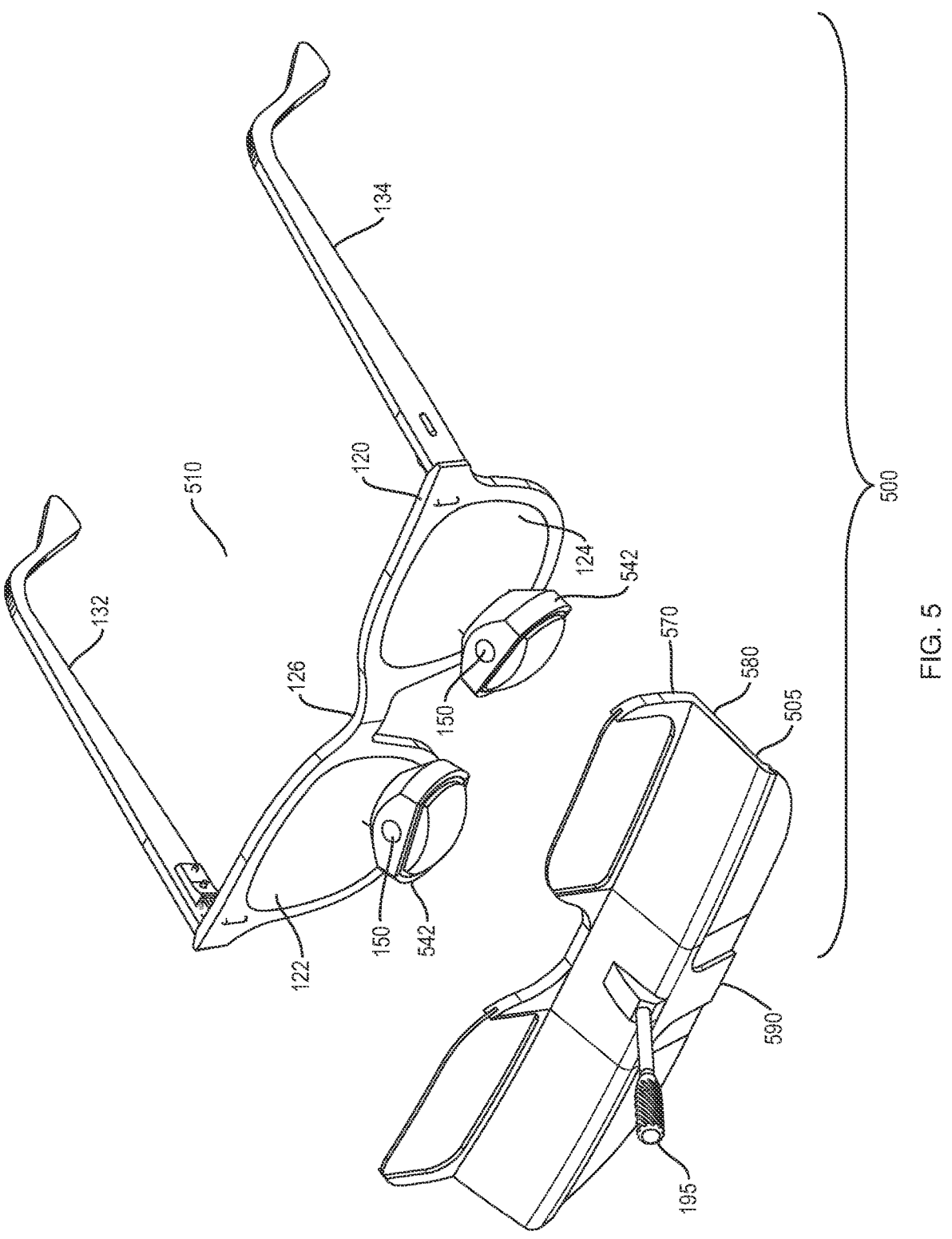
FIG. 5 illustrates an exploded prospective view of a second exemplary embodiment of a removable filter system in accordance with the principles of the invention.

FIG. 5 illustrates an exploded prospective view of a second exemplary of a removable filter system 500 in accordance with the principles of the invention.

In this illustrated exemplary embodiment, filter system 500 comprises eyewear 510 and filter element 505, wherein eyewear 510, similar to eyewear 110, comprises an eyeglass frame 520 comprising a first lens 122 and a second lens 124 connected by bridge element 126. Further illustrated are temples, 132, 134 projecting substantially perpendicular from a free end of corresponding ones of first lens 122 and second lens 124, respectively. Temples 132, 5134 provide a means to retain eyeglasses 510 to a user.

Further illustrated are magnification device 542 incorporated into lens 122 and magnification device device 144 incorporated into lens 124. Magnification devices 542, 544, similar to magnification devices 142, 144, provide for an enlarged or magnified view of an object in a manner similar to that previously discussed.

Further illustrated is at least one element 150 positioned on an upper surface of each of magnification devices 542, 544. Elements 150 as will be discussed provides a means for attaching and retaining filter assembly 505, in place.

Further illustrated is filter assembly 505, which similar to filter assembly 105, includes a lens section 570, an offset section 580 and a magnification section 590. Also shown is attachment rod 195 and passthrough 197 into which attachment rod 195 may be placed.

Figures 6, 7:
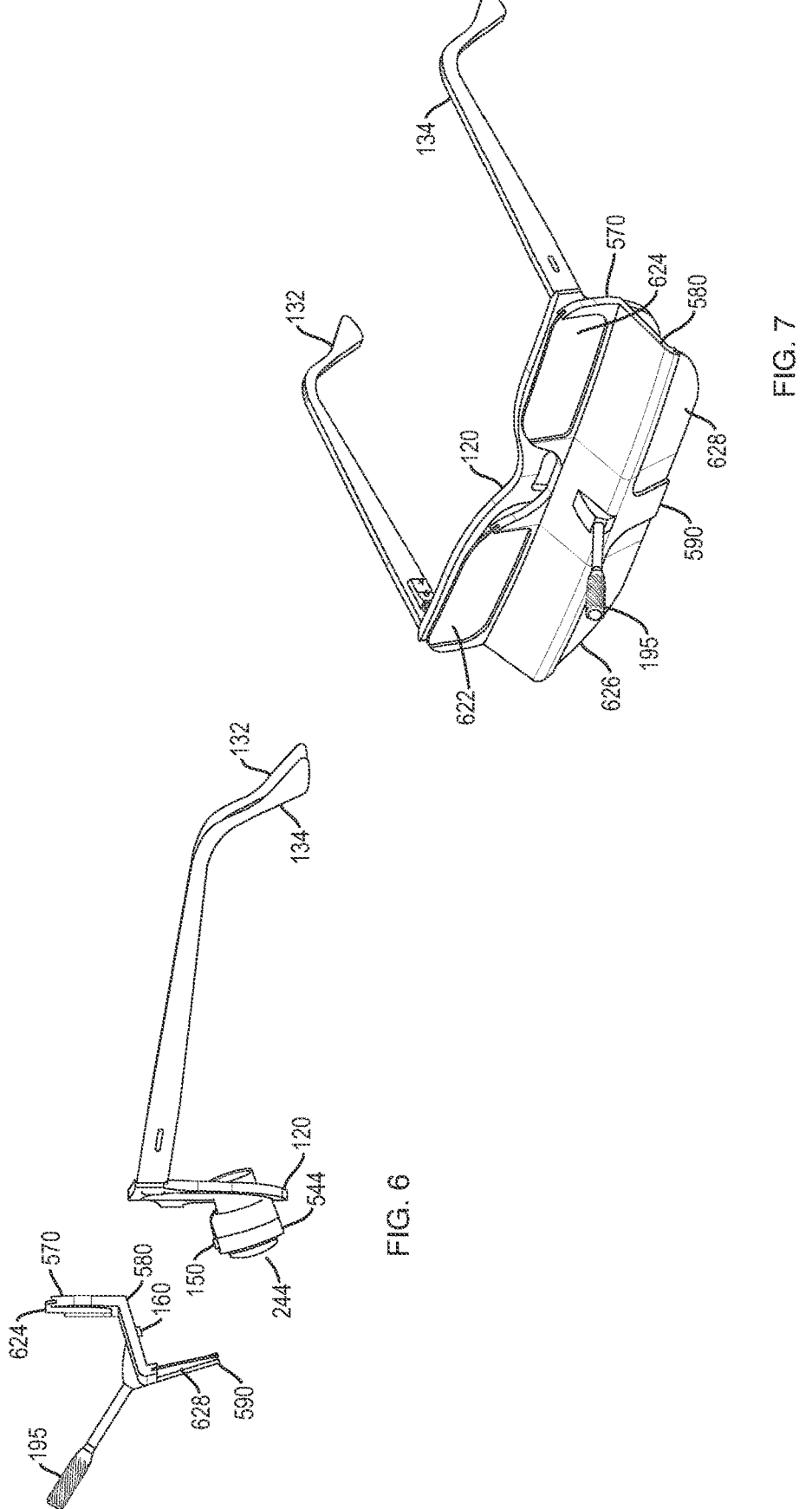
FIG. 6 illustrates a side view of the second exemplary embodiment of the removable filter system shown in FIG. 5.
FIG. 7 illustrates a front view of the second exemplary embodiment of the removable filter system shown in FIG. 5.

FIG. 6 illustrates a side view of the second exemplary embodiment of the filter system shown in FIG. 5.

FIG. 6 illustrates an eyewear 510 comprising frame 120, temples 132, 134 attached to frame 120 and magnification device 544 positioned within lens 124. Further illustrated is element 150 positioned on an upper surface of magnification device 544.

Elements 150, similar to element 150 discussed with regard to FIG. 1, provides a means for retaining filter assembly 505 onto eyewear 510.

In this illustrated embodiment, filter element 505 includes filter 624 positioned within lens section 570 and filter 628 positioned within magnification selection 590. Filters 624 and 628 include filter characteristics similar to the filter characteristics disclosed with regard to filter assembly 105, discussed previously, to limit light viewed through filters 624, 628 to known or desired wavelength bands. In addition, the filter characteristics of filter 624 may be different than the filter characteristics of filter 628 to compensate for the concentration of light viewed through magnification device 544, as previously discussed.

In accordance with this exemplary embodiment, a plurality of elements 160 are positioned on a lower surface of offset element 580 and in alignment with elements 150 positioned on an upper surface of magnetic devices 544, when filter element 505 is positioned adjacent to frame 120.

As discussed previously at least one of elements 150 and 160 may possess a magnetic property that enables element 150 to be attracted to element 160 to retain filter assembly 505 to eyewear 510.

FIG. 7 illustrates a prospective view of an assembled filter system 500 in accordance with the principles of the invention.

In this illustrated embodiment, filter element 505 is (removably) attached to eyewear 510, wherein filters 622, 624, contained within lens section 570, are aligned with lens 122, 124, respectively, of eyewear 510 and filters 626, 628, contained within magnification section 590, aligned with a distal end of magnification devices 542, 544 (not shown).

Figure 8:
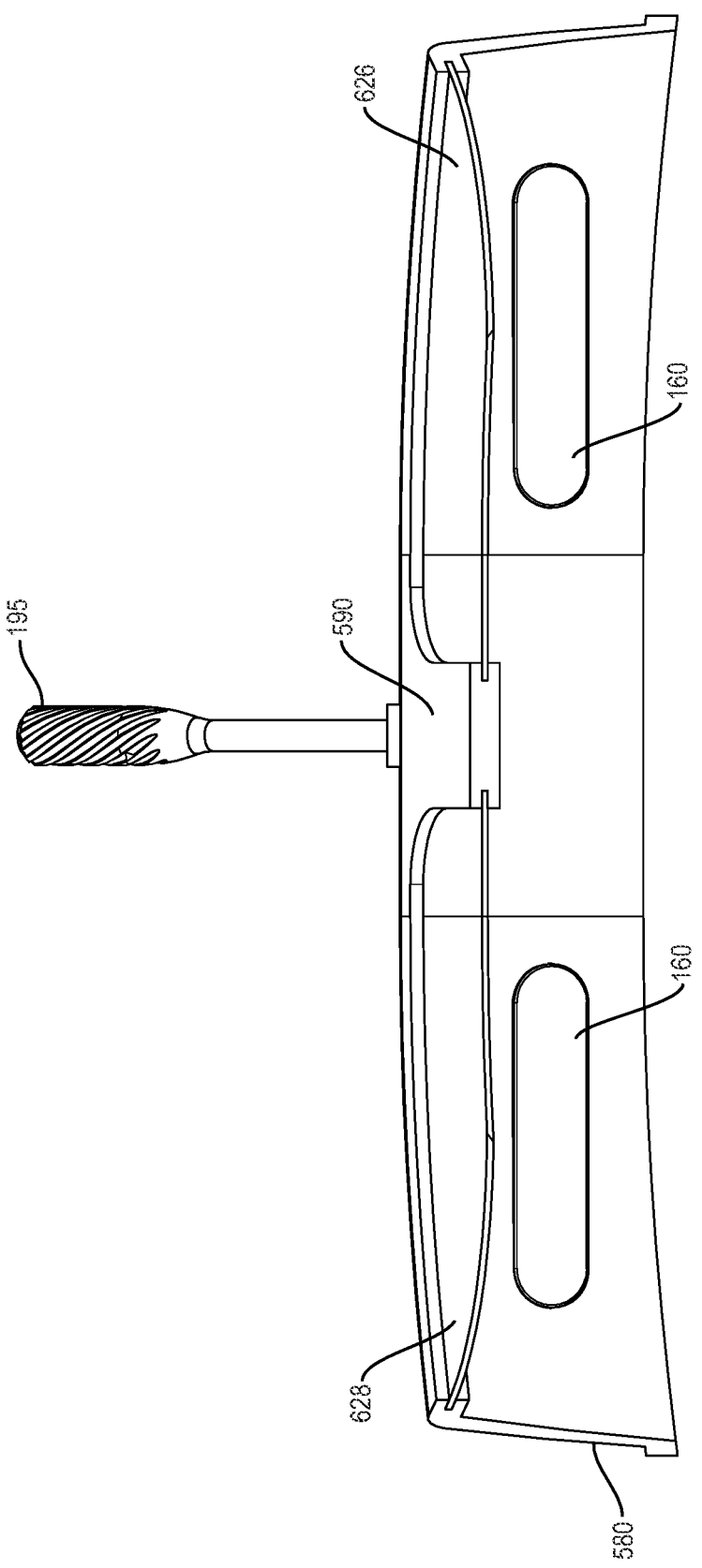
FIG. 8 illustrates a bottom view of the second exemplary embodiment of the removable filter shown in FIG. 5.

FIG. 8 illustrates a bottom view of filter assembly 505 showing the positioning of elements 160 on a lower surface of offset section 580.

In this illustrated embodiment, elements 160 are shown as an elongated element that provides for a loose alignment of elements 150 and 160. In another aspect of the invention, elements 160 may be circular and the attachment of elements 150 and 160 would require a more precise location of elements 150 and 160 to achieve the required attachment feature.

According to the principles of the invention, elements 160 and elements 150 when placed in proximity to each other, the magnetic force between the elements is sufficient to retain filter assembly 505 to magnification devices 542, 544.

Figures 9, 10:
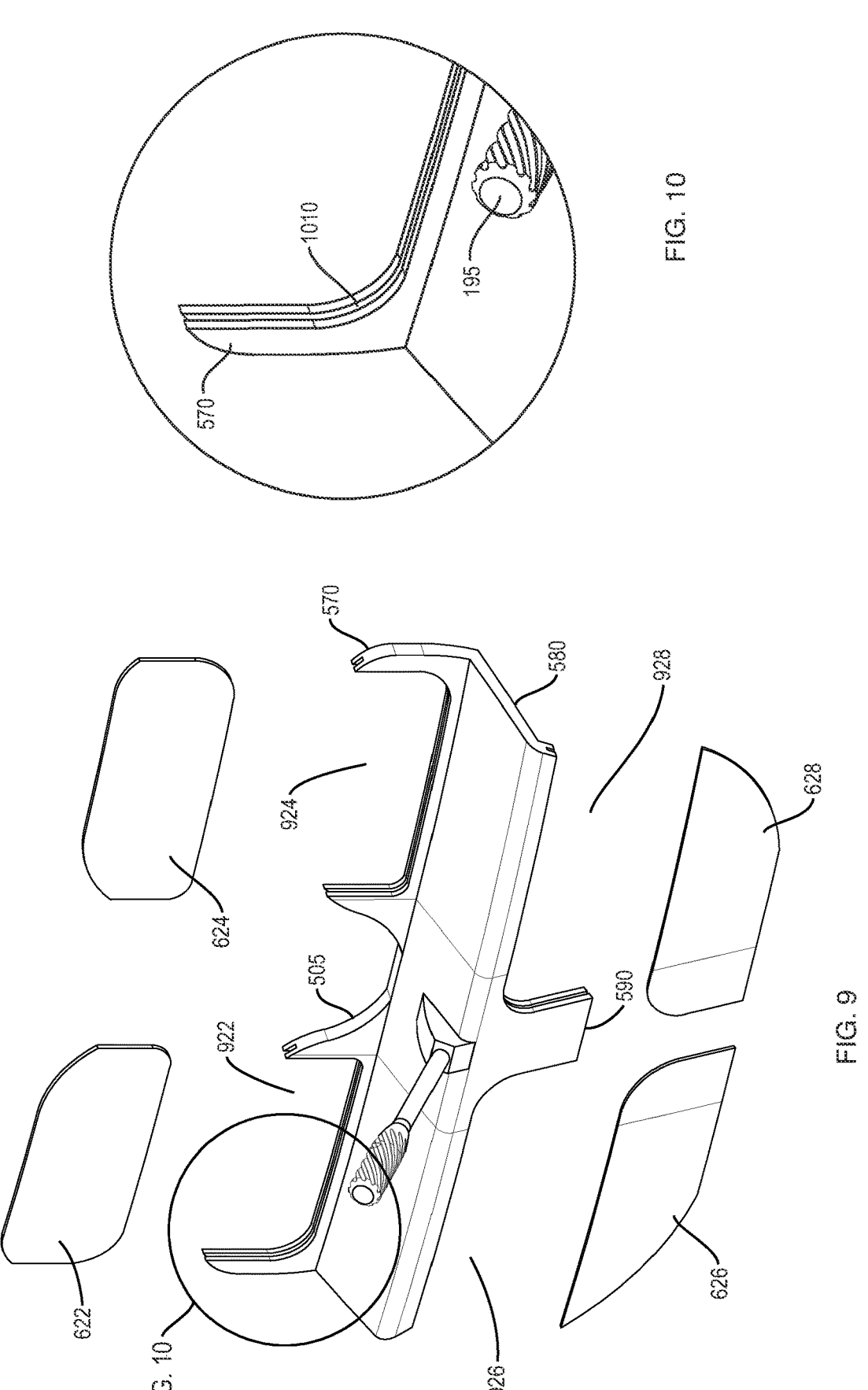
FIG. 9 illustrates an exploded prospective view of the second exemplary embodiment of the removable filter shown in FIG. 5.
FIG. 10 illustrates an expanded prospective view of the area identified as FIG. 10 in FIG. 9.

FIG. 9 illustrates an exploded prospective view of frame assembly 505 in accordance with the principles of the invention.

In this exemplary embodiment, filter assembly 505 comprises lens section 570 and a magnification section 590 separated by an offset section 580, wherein the lens section 570 comprises a left lens filter section 922 and a right lens filter section 924 into which filters 622, 624, respectively, may be inserted. Similarly, magnification section 590 includes a left magnification filter section 926 and a right magnification filter section 928 into which filters 626, 628, respectively, may be inserted.

In accordance with the principles of the invention the filter characteristics of filters 622, 624 may be the same or different than the filter characteristics of filters 626, 628, which has been previously discussed with regard to lens section 170 and magnification section 190. The ability to removably attach filters 622-628 is advantageous as allows for the customization of filter assembly 505 to satisfy desired filter requirements.

FIG. 10 illustrates an exploded view of that area identified as FIG. 10 in FIG. 9, showing a groove 1010 within left section 922 of lens section 570. Groove 1010 provides for the secure attachment of filter 622 to lens section 922. Although not shown, it would be recognized that a groove similar groove 1010 may be found in right lens filter section 924 to retain filter 624 in place and in left magnification filter section 926 and a right magnification filter section 928 to retain filters 626, 628 within corresponding ones of left section 926, 928 of magnification section 590.

Groove 1010 provides for a snap fit connection of lens 622-628 to create a customized filter assembly 505. Although a snap fit connection is discussed, it would be understood that other types of attachments mechanism have been contemplated and considered within the scope of the invention. For example, a set screw may be utilized to retain filters 622-628 in place. In another aspect of the invention, a band may be distributed over an upper surface of filters 622, 624 and over a lower surface of filters 626, 628 to retain filters 622-628 in place.

Figures 11, 12:
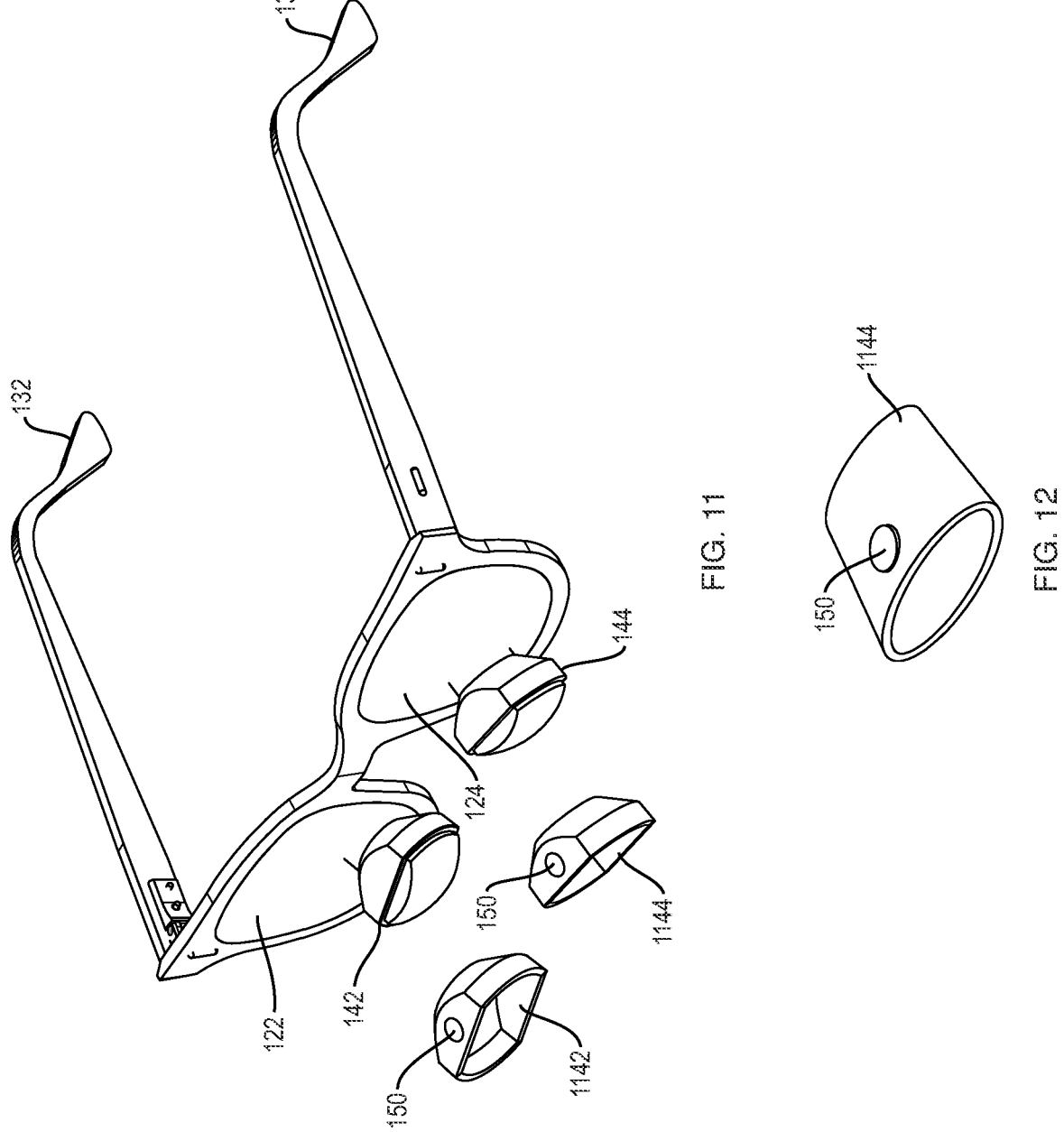
FIG. 11 illustrates an exploded view of the eyewear attachment shown, herein.
FIG. 12 illustrates a prospective view of the eyewear attachment shown in FIG. 11.

FIG. 11 illustrates a prospective view of cap elements 1142, 1144, containing elements 150 that may be placed on corresponding ones of magnification device 142, 144, (shown in FIG. 1) respectively, to form magnification devices 542, 544 (shown in FIG. 5). Caps 1142, 1144 are advantageous to convert existing eyewear to allow for the use of filter assembly 505 disclosed, herein.

FIG. 12 illustrates a prospective view of cap element 1144, wherein cap element 1144 is composed of a shrink-wrap type material that includes element 150. The unformed cap element 1144 illustrated may be slide over existing loupes 144, for example, to allow for the attachment of filter assembly 505, for example.

Although a shrink wrap type material is discussed with regard to cap elements 1142, 1144, it would be recognized that the cap elements 1142, 1144 may be composed of an elastic material that may be slide over magnification devices 141, 142. In another aspect of the invention, cap elements 1142, 1144 may be composed of an elastic band, including elements 150, that may be slide over magnification devices 141, 142. In still another aspect of the invention, cap elements 1142, 1144 may comprise an elastic material that includes a magnetic attachable material (e.g., iron) that may attach to magnets 160 positioned on a lower or bottom surface of offset section 580.

Although the filter assembly 105 is described with regard to possessing a plurality of magnetic elements 160 positioned along an upper edge of lens section 170, it would be recognized that the filter assembly 105 may be modified to position elements 160 along a lower surface of offset section 180 and, thus, attach filter assembly 105 to eyewear 510, shown in FIG. 5. Similarly, filter assembly 505 may be modified to position elements 160 along a surface of lens section 170 to attach filter assembly 505 to eyewear 110 shown in FIG. 1.

In summary, a filter system is disclosed that provides for the removable attachment of a filter assembly to an eyewear that is fitted with magnification device or loupes, wherein the filter assembly is constructed to attenuate wavelengths of light in an undesired wavelength and allow wavelengths in a desired wavelength range to pass substantially unattenuated whether viewed through the lenses of the eyewear or through the loupes.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A filter element comprising:
a lens section, wherein said lens section comprises a first filter element;
a magnification section comprising a second filter element and offset from the lens section by an offset section, wherein the offset section is sized to accommodate a length of a magnification device to which the magnification section is to be placed in front of;
at least one element configured to:
attach said filter element to an eyewear incorporating the magnification device within carrier lenses of the eyewear, wherein said first filter element and said second filter element comprising optical material configured to:
attenuate light wavelengths within an undesired wavelength range; and
allow light wavelengths in a desired wavelength to pass substantially unattenuated.

2. The filter element of claim 1, wherein said at least one element comprises:
at least one of: a ferrous material and a magnet.

3. The filter element of claim 1, wherein said at least one element is positioned on a lower surface of said offset section.

4. The filter element of claim 1, wherein said at least one element is positioned adjacent an upper edge of said lens section.

5. The filter element of claim 1, wherein said optical material of said first filter element comprises a first optical density and said optical material of said second filter element comprises a second optical density.

6. The filter element of claim 5, wherein said first optical density and said second optical density are substantially equal.

7. The filter element of claim 5, wherein said first optical and said second optical density are different.

8. The filter element of claim 1, wherein said lens section comprises a plurality of lens filter sections, and
said first filter element comprises a plurality of lens filter elements, each of said lens filter elements being insertable into a groove in a corresponding one of said plurality of lens filter sections.

9. The filter element of claim 1, wherein said magnification section comprises a plurality of magnification filter sections, and
said second filter element comprises a plurality of magnification filter elements, each of said plurality of magnification filter elements being insertable into a groove in a corresponding one of said plurality of magnification filter sections.

10. An eyewear filter system comprising:
an eyewear comprising:
a frame comprising:
a bridge element separating a left lens and a right lens, and
a left magnification device incorporated into said left lens and a right magnification incorporated into said right lens; and
a filter assembly comprising:
a first section comprising a first filter section;
a second section comprising a second filter section; and
an offset section, wherein said offset section offsets said second section from said first section by a distance determined based on a length of said left magnification device and said right magnification device and said second section is oriented with respect to said offset section to be substantially proximate a distal end of said left magnification device and said right magnification device, and
a means for attaching said filter assembly to said eyewear.

11. The eyewear filter system of claim 10, wherein said means for attaching said filter element to said eyewear comprises:
a plurality of magnetic elements positioned along a surface of at least one of said frame and said first section.

12. The eyewear filter system of claim 10, wherein said means for attaching said filter element to said eyewear comprises:
a plurality of magnetic elements positioned along at least one of: a top surface of said left magnification device and said right magnification device, and a bottom surface of said offset section.

13. The eyewear filter system of claim 10, wherein said first filter section comprises:
a left filter section associated with said left lens; and
a right filter section associated with said right lens, each of said left filter section and said right filter section including a groove therein.

14. The eyewear filter system of claim 13, further comprising:
a left filter insertable into said groove of said left filter section; and
a right filter insertable into said groove of said right filter section.

15. The eyewear filter system of claim 10, wherein said second filter section comprises:
a left second filter section associated with said left magnification device; and
a right second filter section associated with said right magnification device, each of said left second filter section and said right second filter section including a groove therein.

16. The eyewear filter system of claim 15, further comprising:
a left second filter insertable into said groove of said left second filter section; and
a right second filter insertable into said groove of said right second filter section, wherein an optical density of said left second filter and right second filter is determined based on a magnification level of said left magnification device and said right magnification device.

17. An eyewear filter system comprising:

an eyewear comprising:

a frame comprising:

a left lens, a right lens;

a left loupe incorporated into said left lens and a right loupe incorporated into said right lens; and a cap element positioned over each of said left loupe and said right loupe, said cap element including an element attractable by a magnetic force positioned on an upper surface of each of said left loupe and said right loupe; and a filter element comprising:

a first section;

a second section; and an offset section, wherein the offset section includes a material attractable by a magnetic force.

18. The eyewear filter system of claim 17, wherein said magnetic force is generated by at least one magnetic element positioned on at least one of: said offset section and said cap element.

\* \* \* \* \*